US012683389B2

(12) United States Patent
Quax et al.

(10) Patent No.: US 12,683,389 B2
(45) Date of Patent: Jul. 14, 2026

(54) ESD CIRCUIT WITH GGNMOS TRANSISTORS AND BALLAST CIRCUITS

(71) Applicant: NXP B.V., Eindhoven (NL)

(72) Inventors: Guido Wouter Willem Quax, Wijchen (NL); Alma Anderson, Chandler, AZ (US)

(73) Assignee: NXP B.V., Eindhoven (NL)

( * ) Notice: Subject to any disclaimer, the term of this patent is extended or adjusted under 35 U.S.C. 154(b) by 187 days.

(21) Appl. No.: 18/654,078

(22) Filed: May 3, 2024

(65) Prior Publication Data

US 2025/0343408 A1      Nov. 6, 2025

(51) Int. Cl.
*H02H 9/04* (2006.01)

(52) U.S. Cl.
CPC .................................. *H02H 9/046* (2013.01)

(58) Field of Classification Search
CPC ....................................................... H02H 9/046
USPC .......................................................... 361/56
See application file for complete search history.

(56) References Cited

U.S. PATENT DOCUMENTS

| | | | |
|---|---|---|---|
| 6,424,013 | B1 | 7/2002 | Steinhoff et al. |
| 7,106,568 | B2 | 9/2006 | Chen |
| 8,102,001 | B2 | 1/2012 | Ker et al. |
| 9,269,703 | B2 | 2/2016 | Pok et al. |
| 10,020,299 | B2 | 7/2018 | Lai |
| 2005/0275029 | A1 | 12/2005 | Watt |
| 2013/0285111 | A1 | 10/2013 | De Sarro et al. |

| | | | | |
|---|---|---|---|---|
| 2017/0278839 | A1 | | 9/2017 | Lai |
| 2017/0310104 | A1 | * | 10/2017 | Kabir ................... H10D 89/911 |
| 2020/0395751 | A1 | * | 12/2020 | Stockinger ........... H10D 89/819 |
| 2022/0209527 | A1 | * | 6/2022 | de Raad ................ H02H 9/005 |

FOREIGN PATENT DOCUMENTS

WO              2018119569 A1      7/2018

OTHER PUBLICATIONS

Ker, M., "ESD Protection Design for Mixed-Voltage I/O Circuit with Substrate-Triggered Technique in Sub-Quarter-Micron CMOS Process", Proceedings International Symposium on Quality Electronic Design, Mar. 18-21, 2002.
Pan, L., "RC-Triggered Silicon Controlled Rectifier-based ESD Clamp with Fast Transient Reaction", 2023 China Semiconductor Technology International Conference (CSTIC), Jun. 26-27, 2023.
Park, M., "Concurrent ESD and Surge Protection Clamps in RF Power Amplifier", 2019 41st Annual EOS/ESD Symposium (EOS/ESD), Sep. 15-20, 2019.
Song, B., "Design analysis of novel substrate-triggered GGNMOS in 65nm CMOS process", 2010 17th IEEE International Symposium on the Physical and Failure Analysis of Integrated Circuits, Jul. 5-9, 2010.

* cited by examiner

*Primary Examiner* — Sreeya Sreevatsa
(74) *Attorney, Agent, or Firm* — David G. Dolezal

(57) ABSTRACT

An electrostatic discharge circuit for a semiconductor die includes a plurality of GGNMOS transistors coupled between a first rail and a second rail of the semiconductor die. Each GGNMOS transistor includes a body contact that is coupled to a trigger rail through a ballast circuit and is coupled to the second rail. During the detection of an ESD event of a sufficient severity, the trigger rail is placed in an asserted condition to make the GGNMOS transistors conductive to discharge ESD current from the first rail to the second rail.

20 Claims, 6 Drawing Sheets

ESD CIRCUIT WITH GGNMOS TRANSISTORS AND BALLAST CIRCUITS

BACKGROUND OF THE INVENTION

Field of the Invention

This invention relates to an ESD circuit for a semiconductor die with multiple GGNMOS transistors.

Background

Some semiconductor die utilize electrostatic discharge (ESD) clamp devices for discharging charge from an ESD event affecting a die terminal. One example of an ESD clamp device is a grounded gate NMOS (GGNMOS) transistor. A GGNMOS is an NMOS transistor in which the gate is electrically coupled to its source or biased at a voltage that is less than the bias voltage of the source.

An ESD event may occur when a charged object (e.g., a human finger) inadvertently contacts a conductive surface of a semiconductor die (e.g., a die terminal such as a contact pad, post, or bump) or a conductive surface of a semiconductor die package coupled to the die terminal where charge at an elevated voltage is applied to the conductive surface due to the contact. Being at an elevated voltage, such charge may cause voltage differentials across the devices of the integrated circuit that may exceed their safe operating areas and damage those devices. An ESD event may also occur when a charged conductive surface of a circuit contacts an external object where charge is transferred between the conductive surface and the external object.

FIG. 8 is a circuit diagram of a prior art circuit that include three NMOS transistors 803, 805, and 807. The gates of the three transistors (803, 805, and 807) are electrically connected to pad 817. The drains of the three transistors (803, 805, and 807) are electrically connected to pad 819. The sources of the three transistors (803, 805, and 807) are electrically connected to pad 821. The body contacts (825) of each transistor (803, 805, and 807) are electrically connected to each other and are each electrically coupled to pad 821 by a 400 ohm resistor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As disclosed herein, an electrostatic discharge circuit for a semiconductor die includes a plurality of GGNMOS transistors coupled between a first rail and a second rail of the semiconductor die. Each GGNMOS transistor includes a body contact that is coupled to a trigger rail through a ballast circuit and is coupled to the second rail. During the detection of an ESD event of a sufficient severity, the trigger rail is placed in an asserted condition to make the GGNMOS transistors conductive to discharge ESD current from the first rail to the second rail.

In one embodiment, coupling the body contact of each GGNMOS transistor to a trigger rail through a ballast circuit may increase the voltage headroom between an asserted trigger rail and the body contacts of the GGNMOS transistors having a shorter rail path distance to a trigger device when the trigger device is activated to place the trigger rail in an asserted condition. With the increased voltage headroom for the closer GGNMOS transistors on the ESD rail, the voltage on the trigger line may remain high enough such that the body contacts of the GGNMOS transistors at locations on the trigger line having a farther rail path distance from the trigger device will be at a sufficient voltage to trigger the GGNMOS transistors. This may provide for an increased probability that all of the GGNMOS transistors will become conductive during an ESD event to discharge ESD current from one rail to another rail.

An array of GGNMOS (Grounded Gate NMOS) transistors coupled in parallel can be used to protect semiconductor devices of a die during an ESD event. When triggered, the GGNMOS transistors can provide a sufficiently sized conductive path from one conductive structure to another to reliably discharge built up ESD charge. In some embodiments, utilizing multiple GGNMOS transistors in parallel may allow for a number of smaller sizes transistors to be used to increase die integration feasibility. In some instances, utilizing several smaller GGNMOS transistors connected in parallel for ESD discharge may be necessary in order to comply with design guidelines regarding latch up, which require substrate contacts at regular intervals. In contrast, when ESD current is discharged only through a significantly smaller subset of the GGNMOS transistors, the ESD current is not discharged in a timely manner which may damage the devices being protected and damage the smaller number of GGNMOS transistors that are conductive. Consequently, an ESD circuit designed to provide for an increased probability of all GGNMOS transistors being conductive during an ESD event of sufficient severity is highly desirable.

Figure 1:
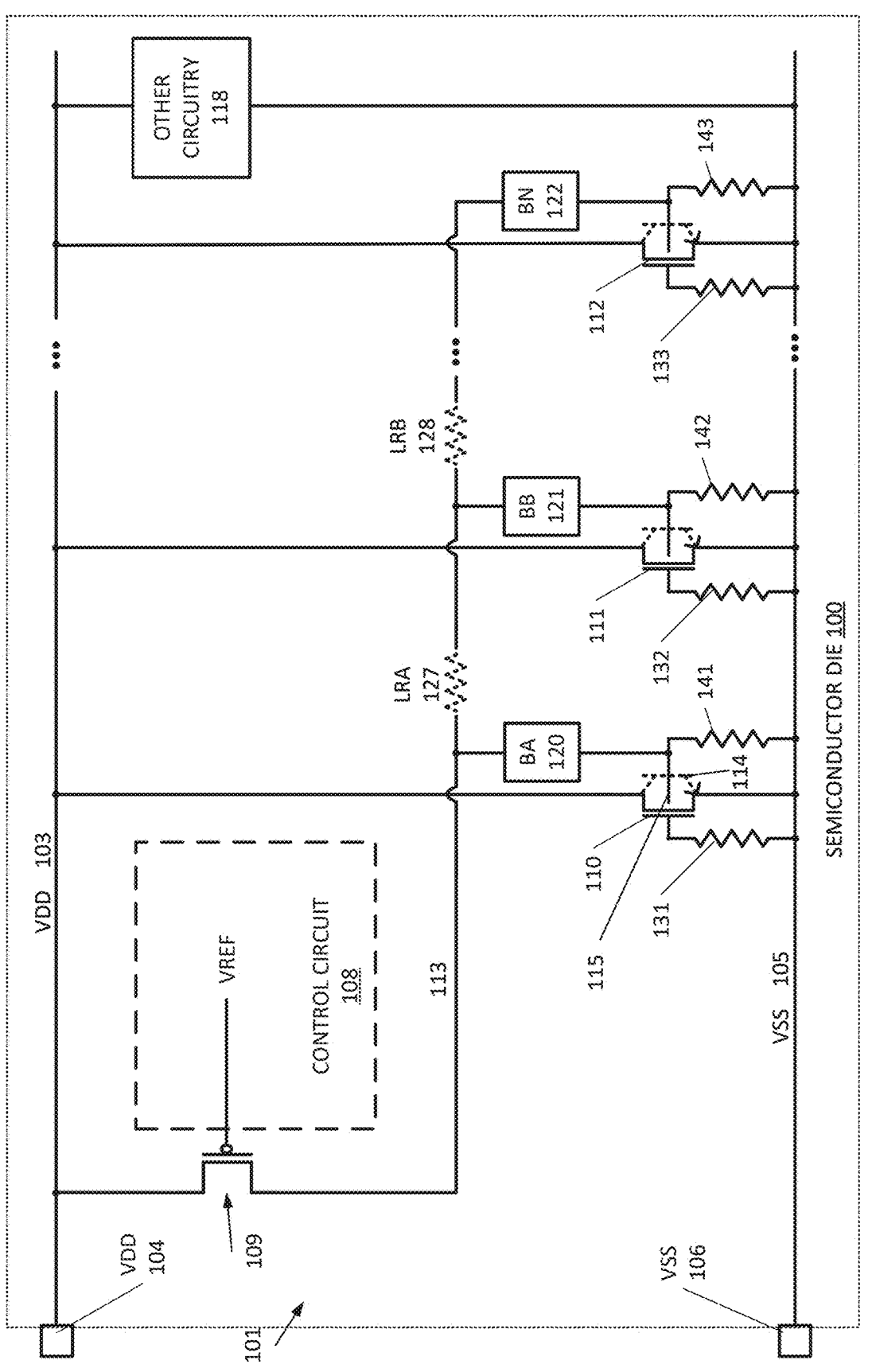
FIG. 1 is a circuit diagram of circuitry of a semiconductor die with an ESD circuit according to one embodiment of the present invention.

FIG. 1 is a circuit diagram of circuitry of a semiconductor die 100 that includes an ESD circuit 101 according to one embodiment of the present invention. ESD circuit 101 includes a plurality of GGNMOS transistors 110-112 coupled in parallel where the drains of the GGNMOS transistors are connected to VDD supply voltage rail 103 and the sources of the GGNMOS transistors are connected to VSS supply voltage rail 105. Although FIG. 1 only shows three GGNMOS transistors (110-112), other embodiments may include two transistor or include more than three transistors. The GGNMOS transistors may be located in one area of semiconductor die 100 or may be distributed throughout semiconductor die 100 In the embodiment shown, rail 103 is biased by VDD die terminal 104. Rail 103 is used to provide a VDD supply voltage to other circuitry 118 of die 101. However, in other embodiments, rail 103 may be a signal line connected to an I/O signal die terminal that carries a signal to and/or from other circuitry 118. Rail 105 is a low VSS supply voltage rail that is biased by VSS die terminal 106.

In some embodiments, the other circuitry 118 of die 100 may include one of more types of circuits such as e.g., analog, digital, mix signal, buffer, processor, memory, sensor, power, discrete, and/or wireless circuits. Semiconductor die may be packaged in a packaging material (e.g., molding compound, epoxy, or plastic (not shown)) to form a semiconductor die package that is implemented in any one of a number of systems such as e.g., computers, cell phones, automotive electronics, wearables, IOT systems, industrial control equipment, embedded systems, or communications equipment.

Each GGNMOS transistor (110-112) includes a gate that is coupled to rail 105 through a resistor (131-133). In other embodiments, the gates of the GGNMOS transistors may be connected to rail 105. In some embodiments, the body of each GGNMOS transistor is isolated by one or more N-type regions (e.g., a deep N well) from the substrate. Each GGNMOS transistor includes a body contact (115) that is coupled to rail 105 through a resistor (141-143). In some embodiments, to improve device robustness during an ESD event, each GGNMOS transistor may include a silicide blocking layer (not shown) over the source and drain.

Circuit 101 includes an ESD trigger device which is implemented with a PMOS transistor 109 in the embodiment of FIG. 1. The source of PMOS transistor 109 is connected to rail 103 and the drain of PMOS transistor 109 is connected to trigger rail 113. The gate of PMOS transistor 109 is connected to a trigger device control circuit 108 which is implemented with a voltage reference source (VREF) in the embodiment of FIG. 1. In the embodiment shown, the voltage of VREF is greater than or equal to supply voltage VDD or is of a voltage that is within the voltage threshold of PMOS transistor 109 (e.g., 0.7V) from VDD during normal operation such that PMOS transistor 109 remains nonconductive during normal operation.

Circuit 101 includes a ballast circuit (120-122) for each respective GGNMOS transistor (110-112). The ballast circuits each include one terminal connected to the body contact (e.g., 115) of its respective GGNMOS transistor and include another terminal connected to trigger rail 113.

Figure 6:
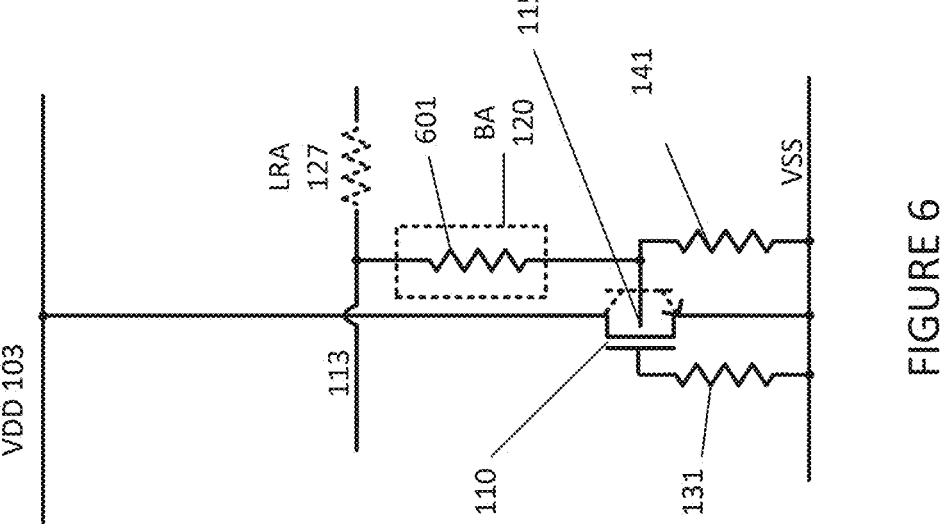
FIG. 6 is a circuit diagram of a GGNMOS transistor and ballast circuit according to one embodiment of the present invention.
Figure 8:
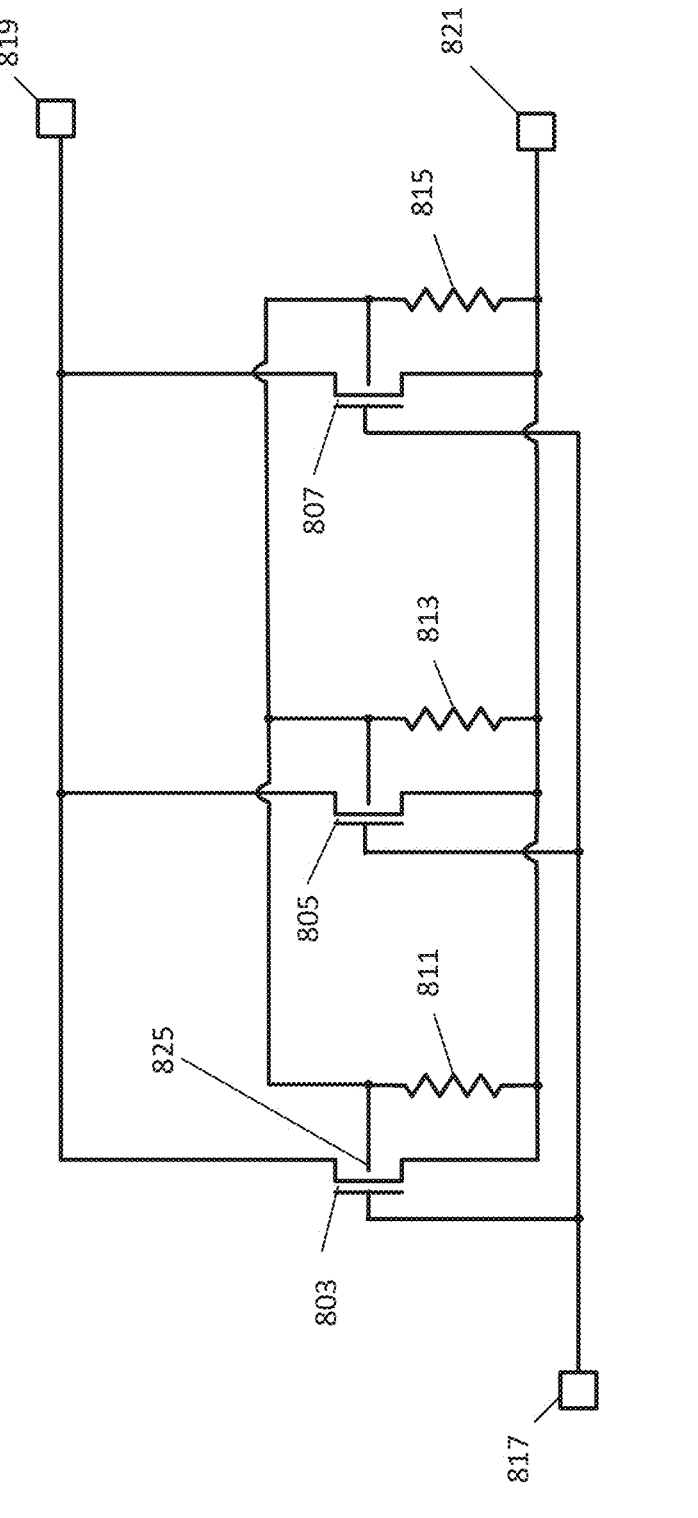
FIG. 8 is a circuit diagram of a prior art circuit.

In some embodiments, each ballast circuit (120-122) is implemented with a resistor. For example, FIG. 6 shows an embodiment where ballast circuit BA 120 is implemented with resistor 601 where one terminal of resistor 601 is connected to trigger rail 113 and the other terminal is connected to the body contact 115 of GGNMOS transistor 110.

Figure 7:
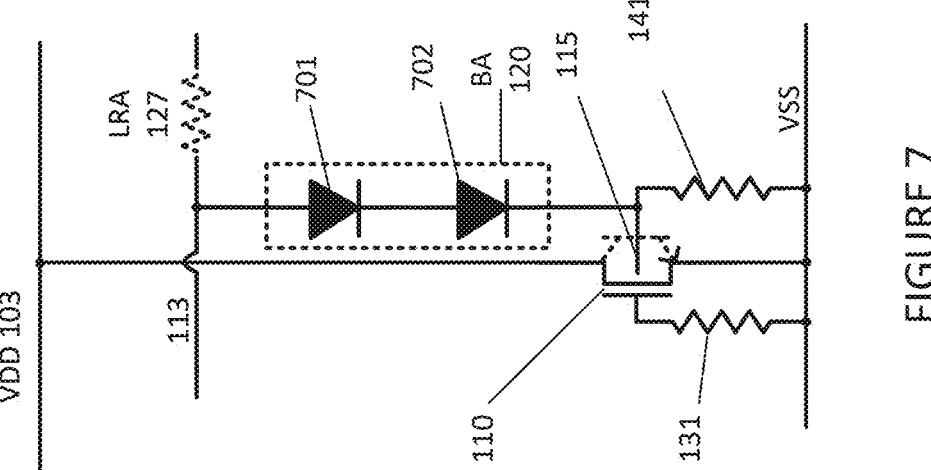
FIG. 7 is a circuit diagram of a GGNMOS transistor and ballast circuit according to one embodiment of the present invention.

In other embodiments, each ballast circuit (120-122) is implemented with a diode circuit of one of more diodes. For example, FIG. 7 shows wherein ballast circuit BA 120 is implemented with a diode circuit of two diodes 701 and 702 connected in series where the anode of diode 701 is connected to trigger rail 103 and the cathode of diode 702 is connected to the body contact 115 of GGNMOS transistor 110.

Referring back to FIG. 1, during normal operation, the voltage of VREF is equal to or higher than the highest voltage of rail 103. Accordingly, PMOS transistor 109 is nonconductive (not activated) during normal operation. In some embodiments, the voltage of VREF during normal operation may be less than the voltage of rail 103 but within the threshold voltage of PMOS transistor 109 of the voltage of rail 103.

During an ESD event of sufficient severity that affects rail 103, the voltage of rail 103 rises rather rapidly to a voltage which may damage the devices of other circuitry 118. When the voltage differential between of rail 103 and VREF rises above the threshold voltage of PMOS transistor 109 (e.g. 7V), PMOS transistor 109 begins to conduct to raise the voltage of ESD rail 113 towards the elevated voltage of rail 103. The rise in the voltage of rail 113 pulls (through ballast circuits 120-122) the voltage of the body contacts (115) of the GGNMOS transistors (110-112) higher. When the voltage of a body contact of a GGNMOS transistor reaches a certain threshold (e.g. 7V), the parasitic NPN transistor (e.g., shown by NPN transistor symbol 114 for transistor 110) of a GGNMOS transistor (110-112) begins to conduct to discharge ESD current from rail 103 to rail 105 to lower the voltage of rail 103 so as not to damage the other circuitry 118 of die 100. Once the voltage of rail 103 falls to a value that is within the threshold voltage of PMOS transistor 109 of the voltage of VREF, PMOS transistor 109 becomes nonconductive to where the voltage of rail 113 falls and the GGNMOS transistors 110-112 become nonconductive.

One issue that may arise with a distributed ESD GGNMOS transistor network as shown in FIG. 1 is that the ESD trigger rail path distance of a GGNMOS transistor to the trigger device may affect whether the GGNMOS transistor becomes conductive when the trigger rail is placed in an asserted condition. Each GGNMOS transistor is at a different location on ESD trigger rail 113 and has a different trigger rail path distance to the trigger device (PMOS transistor 109). Accordingly, the total impedance between a body contact of a GGNMOS transistor and the trigger device may be different for each GGNMOS transistor due to the differences in rail path distances.

In some embodiments, trigger rail 113 is implemented with conductive interconnects and vias in an interconnect layer (not shown) of the semiconductor die 100 which have a resistance per path length. In FIG. 1, these resistances are represented by resistor symbols LRA 127 and LRB 128. Resistor symbol LRA 127 represents the line resistance of trigger rail 113 between the location where ballast circuit 120 is connected to rail 113 and the location where ballast circuit 121 is connected to rail 113. Resistor symbol LRB 128 represents the line resistance of trigger rail 113 between the location where ballast circuit 121 is connected to rail 113 and the location where the next ballast circuit (122) is connected to rail 113. In some embodiments, rail 113 may be implemented with interconnects (not shown) of a smaller width to save space in the interconnect layer. Accordingly, the values of the line resistances represented by symbols 127 and 128 may be relatively large.

Because of the line resistance of rail 113, the voltage of an asserted trigger rail at locations having a longer path distance from device 109 (e.g., the location of ballast circuit 122) may be less than the voltage at the location of the ballast circuit (120) having the closest path distance to device 109. If the ballast circuits (120-122) were not present in the circuit of FIG. 1 where the body contacts (115) of the GGNMOS transistors 110-112 were connected to trigger rail 113, there may be insufficient voltages at locations on trigger rail 113 having a greater path distance from PMOS transistor 109 such that the GGNMOS transistors (e.g., 112) at those locations would not trigger during an ESD event.

However, ballast circuits (120-122) are configured to provide a voltage differential headroom between trigger rail 113 and the body contacts of the GGNMOS transistors (e.g., 110) having shorter path distances on trigger rail 113 during an ESD event. This voltage differential headroom increases the voltages of the body contacts of the GGNMOS transistors (e.g., 112) having longer path distances on trigger rail 113 during an ESD event, thereby increasing the probability that the longer path distance transistors will become conductive during the ESD event.

In some embodiments, ballast circuit 120-122 may be of different parameter values depending upon their path distance on rail 113 from PMOS transistor 109. For example, with embodiments where the ballast circuits are implemented with resistors such as in the embodiment of FIG. 6, the resistors of the ballast circuits having the smallest rail path distance from the ESD trigger device would have the highest resistance (e.g., ballast circuit 120) and the ballast circuits having the longest rail path distances from the ESD trigger device would have the smallest resistance (e.g., ballast circuit 122). In some embodiments, the GGNMOS transistor having the longest rail path distance from the trigger device (GGNMOS transistor 112) would have no ballast circuit. Thus, the voltage differential headroom provided by each ballast circuit would be different depending upon its path distance to the trigger device.

In some embodiments with resistor ballast circuits, the ballast circuits would be sized such that total resistance from the body contact to the trigger device (PMOS transistor 109) would be approximately equal for all GGNMOS transistors. For example, in some such embodiments, the resistance of ballast circuit 120 would be approximately equal to the line resistance represented by resistor symbol 127 plus the resistance of ballast circuit 121 and would also be approximately equal to the line resistance represented by resistor symbols 127 and 128 plus the resistance of ballast circuit 122. With the resistances from the body contacts to the trigger device being approximately equal for all GGNMOS transistors, the body contacts of each GGNMOS transistor would be approximately at the same voltage when ESD rail 113 is in an asserted condition such that all GGNMOS transistors would have a relatively equal chance of being asserted. Accordingly, ESD current can be more quickly discharged from rail 103 to rail 105 thereby minimizing the risk of damage to the devices of die 100.

In some embodiments where a minimal number of different GGNMOS transistor cell designs is desired, the number of different ballast resistor values for a circuit would be limited to a smaller number (e.g., four) than the number of ballasts circuits in an ESD circuit (e.g., 24). In some examples of such an embodiment, the ballast circuits would be grouped into a number of subsets that match the number of different resistance values. The ballast circuits of a subset of the ballast circuits located in a segment of ESD rail 113 would each have a resistor of the same resistance value.

With embodiments where the ballast circuits are implemented with diode circuits of one or more diodes such as in the embodiment of FIG. 7, the ballast circuits having the smallest rail path distance to the trigger device (PMOS transistor 109) would have the highest total forward voltage drop and the ballast circuits having the longest rail path distances from trigger device 109 (ballast circuit 122) would have the smallest total forward voltage drop. In some embodiments, the GGNMOS transistor having the longest rail path distance from trigger device 109 (GGNMOS transistor 122) would have no ballast circuit. In some embodiments, the forward voltage drop would be set by the number of diodes in series of the ballast circuit. The total forward voltage drop is the sum of the forward voltage drops of each of the diodes in series. For the example in FIG. 7, the total forward voltage drop of ballast circuit 120 is the forward voltage drop of diode 701 plus the forward voltage drop of diode 702.

In some embodiments with ballast circuits of one or more diodes, the total forward voltage drop of each ballast circuit would be sized so as to equalize as much as possible, the total voltage drop from the trigger device (PMOS transistor 109) to each body contact for all GGNMOS transistors during an ESD event. This voltage drop calculation would take into account the voltage drops of the line resistances (e.g., as represented by resistor symbols 127 and 128) during a typical ESD event. Accordingly, the ballast circuits (e.g., 120) having the shortest in path distance to the trigger device (PMOS transistor 109) include a greater number of diodes in series to provide a larger total forward voltage drop. In one example of the embodiment of FIG. 1, ballast circuit 120 would include three diodes in series, ballast circuit 121 would include two diodes in series, and diode circuit 122 would include one diode. However, other embodiments with a greater number of GGNMOS transistors may include a different number of diodes in series. Because the forward voltage drop of a diode (e.g., 0.7 V) is a quantized value, subsets of ballast circuits located in one segment of ESD rail 113 may have the same number of diodes, wherein another subset of ballast circuits located in another segment of the rail 113 may have a different number of diodes. Equalizing the voltages for the GGNMOS transistors as much as possible increases the possibility of all GGNMOS transistors being asserted during an ESD event that causes the trigger device (PMOS transistor 109) to place the trigger rail in an asserted condition.

In some embodiment where the ballast circuits 120-122 are implemented with resistors, the ballast circuit resistors and resistors 141-143 may be in a range from 200 to 10K ohms and resistors 131-133 may be in a range from 1K to 150K ohms. But these resistances may be of other values in other embodiments. In some embodiments, VDD may be 1.8V and VREF maybe 3.3 V, but these voltages may be of other values in other embodiments.

Figure 2:
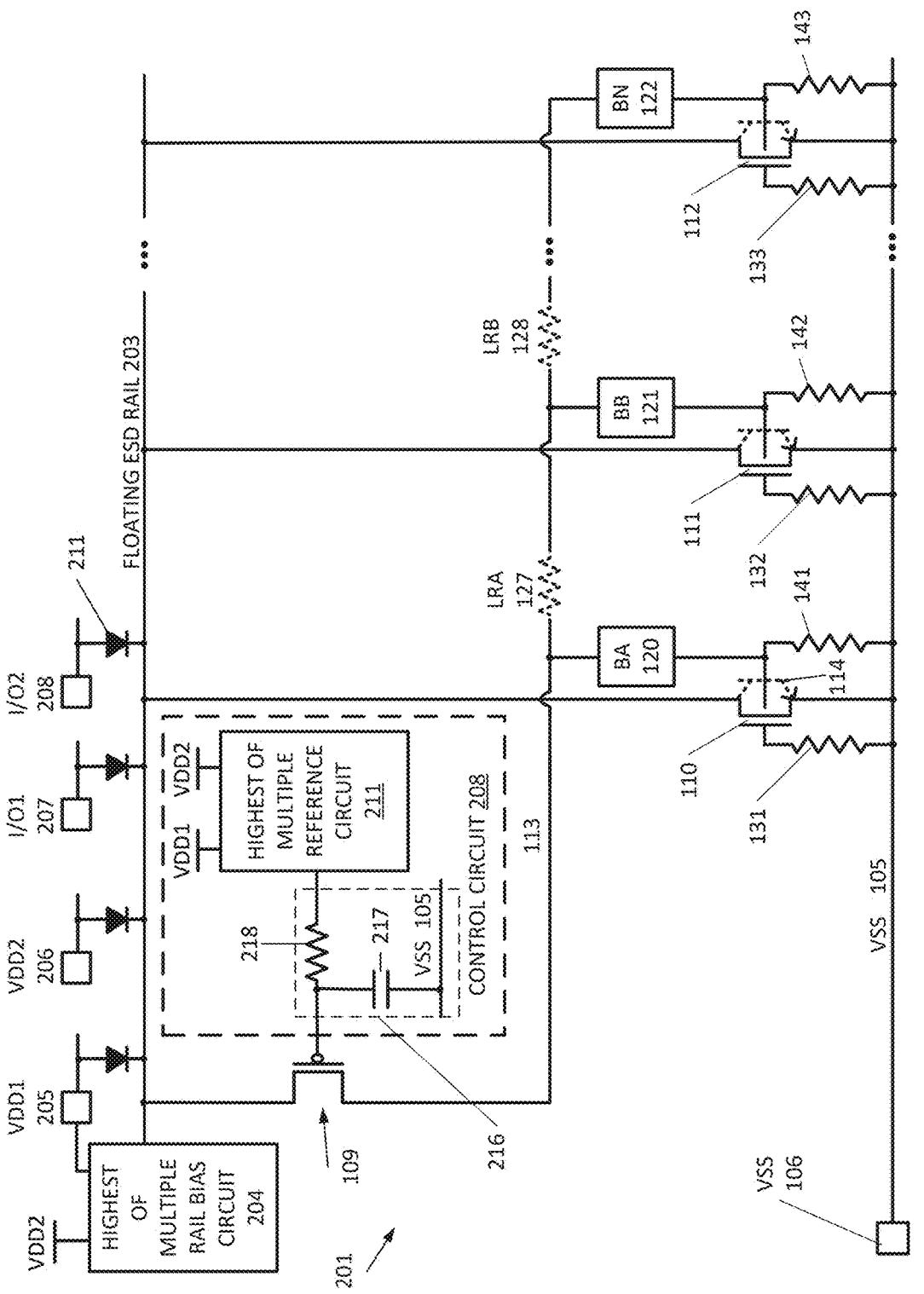
FIG. 2 is a circuit diagram of an ESD circuit of a semiconductor die according to one embodiment of the present invention.

FIG. 2 is a circuit diagram of an ESD circuit 201 for a semiconductor die according to another embodiment of the present invention. The items with the same reference numbers as the items in FIG. 1 are similar.

In FIG. 2, the GGNMOS transistors 110-112 are connected to a "floating" ESD rail 203 to discharge current during an ESD event to VSS rail 105. Both supply voltage die terminals (VDD1 205 and VDD2 206) and I/O die terminals 207-208 are each coupled to ESD rail 203 through a respective diode (211). ESD rail 203 is biased by a highest of multiple rail bias circuit 204 that biases ESD rail 203 by the highest supply voltage at it inputs (VDD1 and VDD2) minus the voltage drop of circuit 204 (approximately 300 mV in some embodiments).

ESD circuit 201 has a trigger device control circuit 208 that includes an RC trigger circuit 216. Trigger circuit 216 includes a resistor 218 and a capacitor 217. The input of the RC trigger circuit 216 (a terminal of resistor 218) is biased by a highest of multiple reference circuit 211. Circuit 211 provides as a reference voltage the highest of the supply voltages at its inputs (VDD1 and VDD2) minus the voltage drop of circuit 211.

During normal operation, both rail 203 and the input of the RC trigger circuit 216 are biased at the higher of supply voltage VDD1 or VDD2 (minus the voltage drops of circuit 204 and circuit 211). Accordingly, PMOS transistor 109 is nonconductive during normal operation. During an ESD event affecting any one of die terminals 205-208, the voltage of rail 203 increases due to the ESD event. When the voltage of rail 203 rises above the voltage of the gate of PMOS transistor 109, PMOS transistor 109 begins to conduct to pull the voltage of rail 113 to an asserted condition where the GGNMOS transistors 110-112 become conductive to discharge ESD current from rail 203 to rail 105.

Control circuit 208 includes trigger circuit 216 for instances where an ESD event would affect either VDD1 die terminal 205 or VDD2 die terminal 206. During an ESD event affecting either of these die terminals, the increase in voltage at the die terminal would raise the voltage of rail 203 as well as raise the voltage provided to trigger circuit 216. For a relative fast voltage spike at either die terminal 205 or die terminal 206 due to an ESD event, trigger circuit 216 would delay the corresponding rise at the gate of PMOS transistor 109 by an amount dependent upon the trigger circuit's RC time constant. Accordingly, PMOS transistor 109 would conduct to place rail 113 in an asserted condition to discharge ESD current form rail 203 during the time that its source is at a higher voltage than its gate by the threshold voltage of PMOS transistor 109.

In other embodiments where only one supply voltage die terminal is coupled to rail 203 (e.g., only VDD1 die terminal 205 is coupled to rail 203 and not VDD2 die terminal 206), that terminal would also be the only terminal connected to the input of RC trigger circuit 216, provided that the supply voltage is equal to or higher than the highest normal operating voltage of any I/O pad.

In some embodiments, the control circuit 108 of FIG. 1 would include an RC trigger circuit similar to RC trigger circuit 216 where VDD would be supplied to the input of the trigger circuit. In other embodiments of FIG. 2, a reference voltage would be coupled to the gate of PMOS transistor 109, similar to control circuit 108 in FIG. 1.

Figure 3:
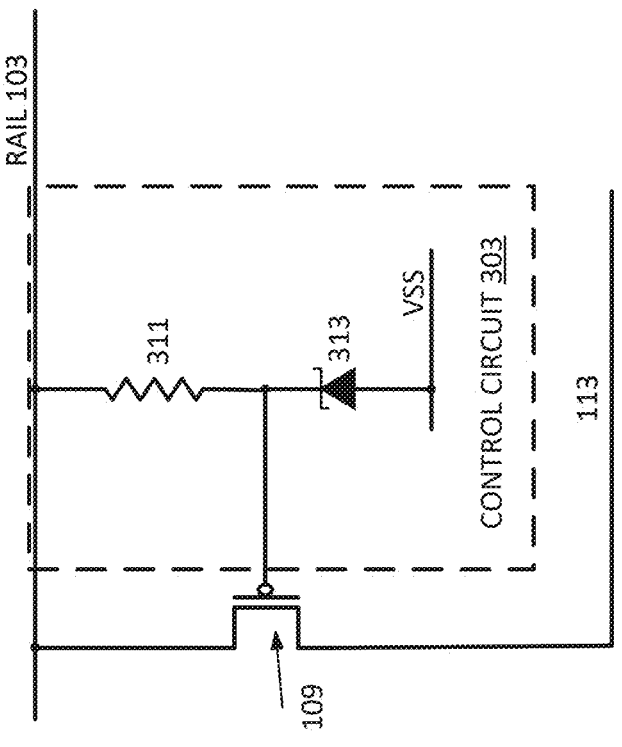
FIG. 3 is a circuit diagram of a control circuit for a trigger device according to one embodiment of the present invention.

FIG. 3 shows a circuit diagram of a trigger device control circuit 303 according to another embodiment of the present invention. Control circuit 303 includes a resistor 311 and a Zener diode 313. Zener diode 313 sets the voltage at the gate of PMOS transistor 109. During normal operation, the voltage at the gate of PMOS transistor 109 is within its voltage threshold of rail 103 such that PMOS transistor 109 will not conduct. During an ESD event (or overvoltage event), PMOS transistor 109 will conduct when the voltage of rail 103 rises to a value that that is greater by the voltage threshold of PMOS transistor 109 from the voltage of the gate of PMOS transistor 109 (which is set by Zener diode 313). ESD rail 13 remains asserted for as long as the source-to-gate voltage of PMOS transistor 109 is greater than the threshold voltage of PMOS transistor 109. In some embodiments, utilizing a Zener diode for a trigger control circuit may allow for the ESD circuit to be utilized to provide overvoltage protection as well.

Figure 4:
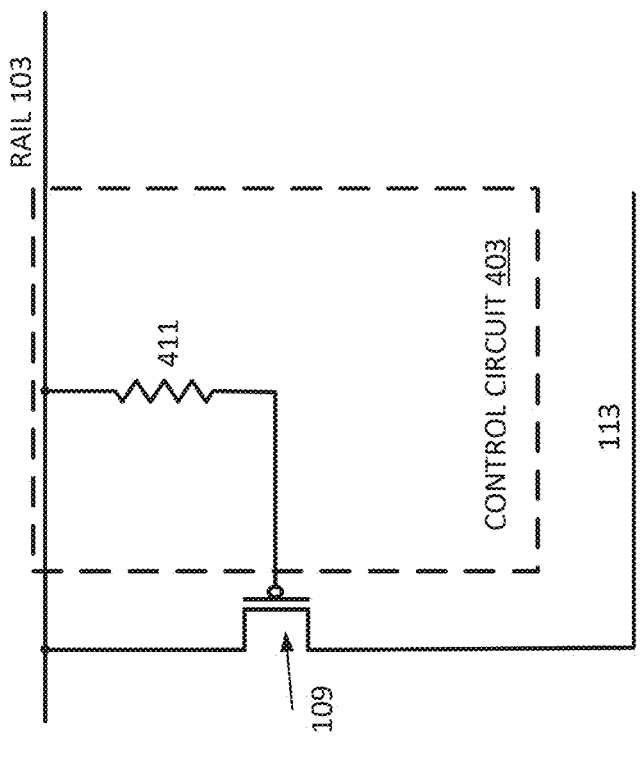
FIG. 4 is a circuit diagram of a control circuit for a trigger device according to one embodiment of the present invention.

FIG. 4 shows a circuit diagram of a trigger device control circuit 403 according to another embodiment. Control circuit 403 includes a resistor 411 connected between the gate of PMOS transistor 109 and rail 103. During normal operation, the voltage at the gate of PMOS transistor 109 is within its voltage threshold of the voltage of rail 103 such that PMOS transistor 109 is nonconductive. During an ESD event that affects rail 103, resistor 411 and the gate capacitance of PMOS transistor 109 act as a trigger circuit to delay the rise in voltage of the gate of PMOS transistor 109 with respect to the rise in voltage of rail 103 so as to make PMOS transistor 109 conductive during an ESD event.

Figure 5:
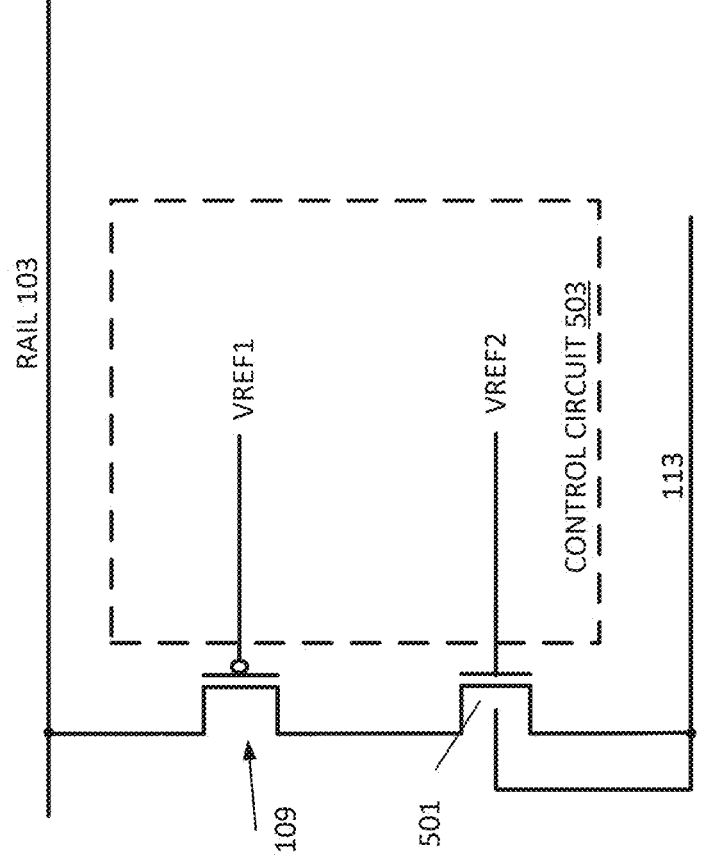
FIG. 5 is a circuit diagram of a control circuit for a trigger device according to one embodiment of the present invention.

FIG. 5 is a circuit diagram of a portion of an ESD circuit according to another embodiment. In the embodiment of FIG. 5, an NMOS transistor 501 is located between PMOS transistor 109 and ESD rail 113 where the drain of transistor 501 is connected to the drain of transistor 109 and the body contact and source of transistor 501 is connected to rail 113. The gate of NMOS transistor 501 is biased at a reference voltage VREF2 which is less than reference voltage VREF1.

During an ESD event where PMOS transistor 109 becomes conductive, NMOS transistor 501 is biased by voltage VREF2 such that NMOS transistor 501 acts as a source follower where the voltage on rail 113 is set to VREF2 minus the threshold voltage of NMOS transistor 501. Accordingly, the asserted voltage on ESD rail 113 can be set to a specific value that prevents overvoltage conditions on ESD rail 113. In one embodiment, VREF1 and VREF2 are provided by a voltage reference circuit with a voltage divider.

Although the embodiments of FIGS. 3-5 are shown as being used with the embodiment of FIG. 1 to discharge ESD current from rail 103, they may also be used with the embodiment of FIG. 2 to discharge current from rail 203. In addition, the source follower configuration of FIG. 5 may be used with the embodiments of FIGS. 1-4.

Other modifications can be made to the circuits of FIGS. 1 in 2 in other embodiments. For example, other types of trigger devices such as multi-transistor trigger devices can be used in place of PMOS transistor 109. Also, other ESD clamp devices such as large NMOS transistors with separate trigger circuits can be used in addition to the GGNMOS transistors (110-112) for ESD protection on rail 103 or rail 203. In still other embodiments, a trigger device control circuit may include multiple RC timer circuits with different time constants and/or Zener diode circuits to provide a wider triggering profile. In still other embodiments, a trigger rail may be coupled to more than one trigger device.

In other embodiments, ESD circuit 101 or ESD circuit 201 may include a boost bus (not shown) that is separate from rail 103 in the embodiment of FIG. 1 or from rail 203 in the embodiment of FIG. 2. In these embodiments, trigger device 109 and trigger control circuits (108, 208) are connected to the boost bus to detect an ESD event and place the ESD rail 113 in an asserted condition. The GGNMOS transistors 110-112 are connected to rail 103 (or rail 203). The one or more die terminals would be connected to both rails through separate diodes.

As used herein, one item is "coupled" to another item in a path either by being connected to the other item or by being coupled in path through at least one further item. For example, in FIG. 1, The gate of transistor 110 is coupled to rail 105 through resistor 131. Ballast circuit 120 is also coupled to rail 113 by being connected to rail 113.

The addition of ballast circuits between an ESD trigger rail and respective body contacts of GGNMOS transistors may help to minimize voltage differences during an ESD event between the body contacts of the GGNMOS transistors due to rail path differences of the locations of the GGNMOS transistors. Accordingly, with such ballast circuits, there is a greater probability that all GGNMOS transistors may become conductive during an ESD event. In some embodiments, utilizing ballast circuits may allow for the use of a smaller ESD trigger rail in that the ballast circuits may counter act the effects of the high impedance of the smaller rail.

One embodiment includes a semiconductor die including an electrostatic discharge (ESD) circuit. The ESD circuit includes a plurality of grounded gate NMOS (GGNMOS) transistors, wherein each GGNMOS transistor of the plurality of GGNMOS transistors is coupled to a first rail at its drain and to a second rail at its source, each GGNMOS transistor of the plurality of GGNMOS transistors includes a body contact coupled to the second rail through a respective resistor circuit of a plurality of resistor circuits, each GGNMOS transistor of the plurality of GGNMOS transistors includes a gate coupled to the second rail. The ESD circuit includes a trigger rail and a plurality of ballast circuits, each ballast circuit of the plurality of ballast circuits is coupled to a respective GGNMOS transistor of the plurality of GGNMOS transistors where the body contact of the respective GGNMOS transistor is coupled to the trigger rail through the each ballast circuit, wherein during an ESD event of a sufficient severity as indicated by the trigger rail being in an asserted condition, ESD current is discharged from the first rail to the second rail through GGNMOS transistors of the plurality of GGNMOS transistors.

In further embodiments, each ballast circuit of the plurality of ballast circuits is implemented with a respective resistor circuit of a second plurality of resistor circuits.

In further embodiments, at least one resistor circuit of the second plurality of resistor circuits is of a higher resistance than another resistor circuit of the second plurality of resistor circuits.

In further embodiments, the ESD circuit includes a trigger device coupled to the trigger rail at a first location, the trigger device is activated during an ESD event of a sufficient severity to place the trigger rail in an asserted condition; the resistor circuits of the at least one resistor circuit of the second plurality of resistor circuits having higher resistances are coupled to the trigger rail at locations that are of a shorter trigger rail path distance to the first location than locations on the trigger rail where the another resistor circuit is coupled.

In further embodiments, each ballast circuit of the plurality of ballast circuits is implemented with a diode circuit of a plurality of diode circuits, where each diode circuit includes of one or more diodes configured in series.

In further embodiments, at least one diode circuit of the plurality diode circuits has a larger total forward voltage drop than another diode circuit of the plurality of diode circuits.

In further embodiments, the ESD circuit includes a trigger device coupled to the trigger rail at a first location, wherein the trigger device is activated during an ESD event of a sufficient severity to place the trigger rail in an asserted condition; diode circuits of the at least one diode circuit of the plurality of diode circuits having larger total forward voltage drops are coupled to the trigger rail at locations that are of a shorter trigger rail path distance to the first location than locations on the trigger rail where the another diode circuit is coupled.

In further embodiments, during an ESD event of a sufficient severity, at least one ballast circuit of the plurality ballast circuits is configured to provide a larger voltage drop than another ballast circuit of the plurality of ballast circuits.

In further embodiments, the semiconductor die further comprising a plurality of I/O terminals, wherein each I/O terminal of the plurality of I/O terminals is coupled to the first rail through a respective diode circuit of a plurality of diode circuits.

In further embodiments, the semiconductor die further comprising a supply voltage terminal coupled to the first rail through a diode circuit.

In further embodiments, the ESD circuit includes a trigger device coupled to the trigger rail; the trigger device is activated during an ESD event of a sufficient severity to place the trigger rail in an asserted condition.

In further embodiments, the trigger device includes a transistor, wherein an RC trigger circuit is coupled to a gate of the transistor.

In further embodiments, the trigger device includes a transistor, wherein a Zener diode is coupled to a gate of the transistor at one terminal of the Zener diode, wherein another terminal of the Zener diode is coupled to the second rail.

In further embodiments, the trigger device includes a PMOS transistor coupled to the first rail at a source of the PMOS transistor; the ESD circuit includes an NMOS transistor coupled to a drain of the PMOS transistor at a drain of the NMOS transistor, the NMOS transistor is coupled to the trigger rail at a source of the NMOS transistor.

In further embodiments, the trigger device includes a PMOS transistor, wherein the PMOS transistor is coupled to the first rail at a source of the PMOS transistor and coupled to the trigger rail at a drain of the PMOS transistor.

In further embodiments, the trigger device includes a transistor, wherein a gate of the transistor is biased by a reference voltage.

In further embodiments, during normal operation, the first rail is biased at a voltage that is one of a group consisting of lower than the reference voltage, equal to the reference voltage, and higher than the reference voltage by an amount less than a threshold voltage of the transistor.

In further embodiments, the trigger device includes a transistor, wherein a gate of the transistor is coupled to a higher of circuit that provides a highest voltage of at least two voltages supplied to the higher of circuit.

In further embodiments, the trigger device includes a transistor, wherein a gate of the transistor is coupled to the first rail through a resistor circuit.

In further embodiments, the ESD circuit further comprises a second plurality of resistor circuits, wherein a gate of each GGNMOS transistor of the plurality of GGNMOS transistors is coupled to the second rail through a respective resistor circuit of the second plurality of resistor circuits.

Features specifically shown or described with respect to one embodiment set forth herein may be implemented in other embodiments set forth herein.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A semiconductor die including an electrostatic discharge (ESD) circuit, the ESD circuit comprising:

a plurality of grounded gate NMOS (GGNMOS) transistors, wherein each GGNMOS transistor of the plurality of GGNMOS transistors is coupled to a first rail at its drain and to a second rail at its source, each GGNMOS transistor of the plurality of GGNMOS transistors includes a body contact coupled to the second rail through a respective resistor circuit of a plurality of resistor circuits, each GGNMOS transistor of the plurality of GGNMOS transistors includes a gate coupled to the second rail;

a trigger rail;

a plurality of ballast circuits, each ballast circuit of the plurality of ballast circuits is coupled to a respective GGNMOS transistor of the plurality of GGNMOS transistors where the body contact of the respective GGNMOS transistor is coupled to the trigger rail through the each ballast circuit, wherein during an ESD event sufficient to place the trigger rail in an asserted condition, ESD current is discharged from the first rail to the second rail through GGNMOS transistors of the plurality of GGNMOS transistors.

2. The semiconductor die of claim 1 wherein each ballast circuit of the plurality of ballast circuits is implemented with a respective resistor circuit of a second plurality of resistor circuits.

3. The semiconductor die of claim 2 wherein at least one resistor circuit of the second plurality of resistor circuits is of a higher resistance than another resistor circuit of the second plurality of resistor circuits.

4. The semiconductor die of claim 3 wherein:

the ESD circuit includes a trigger device coupled to the trigger rail at a first location, the trigger device is activated during an ESD event of a sufficient severity to place the trigger rail in an asserted condition;

the resistor circuits of the at least one resistor circuit of the second plurality of resistor circuits having higher resistances are coupled to the trigger rail at locations that are of a shorter trigger rail path distance to the first location than locations on the trigger rail where the another resistor circuit is coupled.

5. The semiconductor die of claim 1 wherein each ballast circuit of the plurality of ballast circuits is implemented with a diode circuit of a plurality of diode circuits, where each diode circuit includes one or more diodes configured in series.

6. The semiconductor die of claim 5 wherein at least one diode circuit of the plurality diode circuits has a larger total forward voltage drop than another diode circuit of the plurality of diode circuits.

7. The semiconductor die of claim 6 wherein:

the ESD circuit includes a trigger device coupled to the trigger rail at a first location, wherein the trigger device is activated during an ESD event of a sufficient severity to place the trigger rail in an asserted condition;

diode circuits of the at least one diode circuit of the plurality of diode circuits having larger total forward voltage drops are coupled to the trigger rail at locations that are of a shorter trigger rail path distance to the first location than locations on the trigger rail where the another diode circuit is coupled.

8. The semiconductor die of claim 1 wherein during an ESD event of a sufficient severity, at least one ballast circuit of the plurality ballast circuits is configured to provide a larger voltage drop than another ballast circuit of the plurality of ballast circuits.

9. The semiconductor die of claim 1 further comprising a plurality of I/O terminals, wherein each I/O terminal of the plurality of I/O terminals is coupled to the first rail through a respective diode circuit of a plurality of diode circuits.

10. The semiconductor die of claim 9, further comprising a supply voltage terminal coupled to the first rail through a diode circuit.

11. The semiconductor die of claim 1 wherein:

the ESD circuit includes a trigger device coupled to the trigger rail;

the trigger device is activated during an ESD event of a sufficient severity to place the trigger rail in an asserted condition.

12. The semiconductor die of claim 11 wherein the trigger device includes a transistor, wherein an RC trigger circuit is coupled to a gate of the transistor.

13. The semiconductor die of claim 11 wherein the trigger device includes a transistor, wherein a Zener diode is coupled to a gate of the transistor at one terminal of the Zener diode, wherein another terminal of the Zener diode is coupled to the second rail.

14. The semiconductor die of claim 11 wherein:

the trigger device includes a PMOS transistor coupled to the first rail at a source of the PMOS transistor;

the ESD circuit includes an NMOS transistor coupled to a drain of the PMOS transistor at a drain of the NMOS transistor, the NMOS transistor is coupled to the trigger rail at a source of the NMOS transistor.

15. The semiconductor die of claim 11 wherein the trigger device includes a PMOS transistor, wherein the PMOS transistor is coupled to the first rail at a source of the PMOS transistor and coupled to the trigger rail at a drain of the PMOS transistor.

16. The semiconductor die of claim 11 wherein the trigger device includes a transistor, wherein a gate of the transistor is biased by a reference voltage.

17. The semiconductor die of claim 16 wherein during normal operation, the first rail is biased at a voltage that is one of a group consisting of lower than the reference voltage, equal to the reference voltage, and higher than the reference voltage by an amount less than a threshold voltage of the transistor.

18. The semiconductor die of claim 11 wherein the trigger device includes a transistor, wherein a gate of the transistor is coupled to a higher of circuit that provides a highest voltage of at least two voltages supplied to the higher of circuit.

19. The semiconductor die of claim 11, wherein the trigger device includes a transistor, wherein a gate of the transistor is coupled to the first rail through a resistor circuit.

20. The semiconductor die of claim 1 wherein the ESD circuit further comprises a second plurality of resistor circuits, wherein a gate of each GGNMOS transistor of the plurality of GGNMOS transistors is coupled to the second rail through a respective resistor circuit of the second plurality of resistor circuits.

* * * * *